(12) United States Patent
Weckstrom

(10) Patent No.: US 6,268,829 B1
(45) Date of Patent: Jul. 31, 2001

(54) DOPPLER DIRECTION FINDER AND METHOD OF LOCATION USING DOPPLER DIRECTION FINDER

(75) Inventor: Mikko Tapani Weckstrom, Surrey (GB)

(73) Assignee: Nokia Telecommunications Oy, Espoo (FI)

( * ) Notice: Subject to any disclaimer, the term of this patent is extended or adjusted under 35 U.S.C. 154(b) by 0 days.

(21) Appl. No.: 09/341,799
(22) PCT Filed: Jan. 20, 1998
(86) PCT No.: PCT/EP98/00275
 § 371 Date: Sep. 13, 1999
 § 102(e) Date: Sep. 13, 1999
(87) PCT Pub. No.: WO98/34125
 PCT Pub. Date: Aug. 6, 1998

(30) Foreign Application Priority Data
 Feb. 3, 1997 (GB) .................................................. 9702153

(51) Int. Cl.[7] ....................................................... G01S 3/52
(52) U.S. Cl. .......................... 342/418; 342/449; 342/457; 342/458
(58) Field of Search ................................... 342/418, 439, 342/449, 417, 457, 458

(56) References Cited

U.S. PATENT DOCUMENTS

| | | | |
|---|---|---|---|
| 3,787,862 | * 1/1974 | Jacobson | 343/113 DE |
| 3,866,227 | * 2/1975 | Ruvin | 343/106 D |
| 3,991,418 | * 11/1976 | Bennett | 343/113 R |
| 4,551,727 | * 11/1985 | Cunningham | 343/418 |
| 4,845,502 | * 7/1989 | Carr et al. | 342/430 |
| 4,954,835 | 9/1990 | Lanciaux . | |
| 5,572,427 | 11/1996 | Link et al. . | |
| 5,574,467 | * 11/1996 | Saunders | 342/398 |
| 5,859,612 | * 1/1999 | Gilhousen | 342/457 |

FOREIGN PATENT DOCUMENTS

| | | |
|---|---|---|
| 35 12 512 | 5/1986 | (DE) . |
| 36 36 630 | 4/1988 | (DE) . |
| 431 956 | 6/1991 | (EP) . |
| 88/09938 | 12/1988 | (WO) . |

OTHER PUBLICATIONS

Doris I. Wu; "Omnidirectional Circularaly–Polarized Conformal Microstrip Array for Telemetry Applications"; *IEEE Antennas and Propagation Society International Symposium Digest* ;Newport Beach; Jun. 18–23, 1995; vo. 2, pp. 998–1001.

* cited by examiner

Primary Examiner—Dao Phan
(74) Attorney, Agent, or Firm—Merchant & Gould P.C.

(57) ABSTRACT

A Doppler Direction Finder comprises at least one antenna (52) spaced from a location point (53). The at least one antenna (52) is arranged in use to be rotated about the rotation point (53). The at least one antenna (52) is arranged to provide a first output signal comprising a signal received by said at least one antenna (52) combined with the Doppler Shift component. There are means (70) for providing a second output signal comprising the received signal without the Doppler Shift component. Processing means (54–82) process the first and second signals to obtain the Doppler Shift component. Determining means (88) determine from the Doppler Shift component the direction from which the received signal is received.

37 Claims, 5 Drawing Sheets

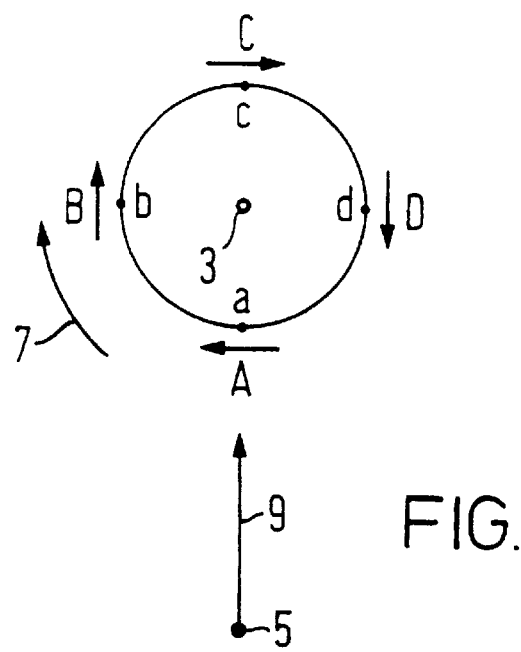
FIG. 2
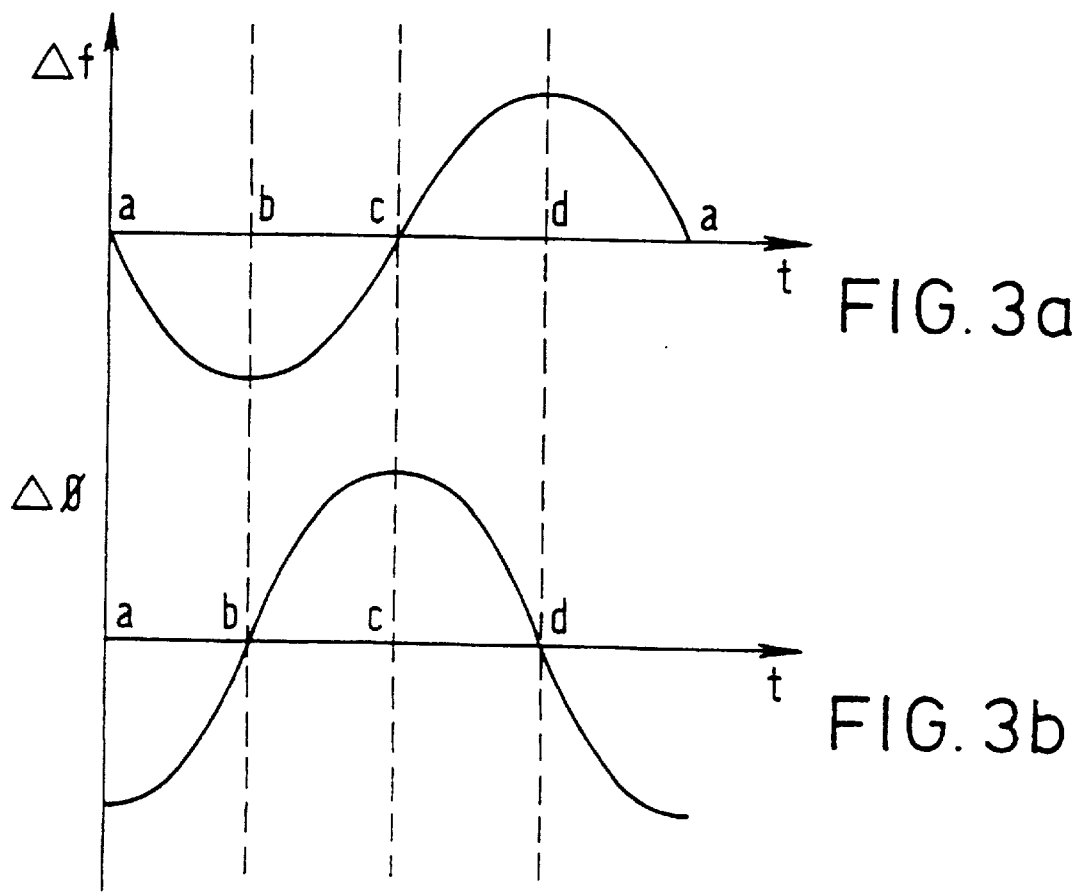
FIG. 3a
FIG. 3b

DOPPLER DIRECTION FINDER AND METHOD OF LOCATION USING DOPPLER DIRECTION FINDER

CROSS-REFERENCES TO RELATED APPLICATIONS

Not Applicable.

STATEMENT REGARDING FEDERALLY SPONSORED RESEARCH OR DEVELOPMENT

Not Applicable.

REFERENCE TO A "MICROFICHE APPENDIX"

Not Applicable.

BACKGROUND OF THE INVENTION

1. Field of the Invention

The present invention relates to a Doppler direction finder and, in particular but not exclusively, to a Doppler direction finder for use in a cellular telecommunications network station. The present invention also relates to a method of locating, for example, a mobile station using a Doppler direction finder.

2. Description of the Related Art

Doppler direction finders are known which are designed to determine the direction from which a signal has been received. However, these known Doppler direction finders are generally designed to work with received signals having a relatively simple modulation such as for example frequency modulation or amplitude modulation. The known Doppler direction finders may not be suitable for use with received signals having a relatively complicated modulation such as Gaussian minimum shift keying (GMSK). In particular, the known Doppler direction finders require an increased amount of time in order to determine the direction from which a signal has been received, if complex modulation is used. This can be a problem if the direction finder has to determine the directions from which a number of signals are simultaneously received. Further, the accuracy of the known Doppler direction finders may decrease with increased modulation complexity. With more complex modulation, the detection range, and accuracy of the Doppler direction finder is reduced.

In known cellular communication networks, a fixed base transceiver station (BTS) is arranged to transmit signals to and receive signals from mobile stations (MS), for example mobile telephones, which are located in the cell or cell sector served by that base transceiver station. For general communication traffic between the BTS and MS, information on the exact location of the mobile station within the cell or cell sector is not of importance provided that the quality of the communication between the BTS and MS is satisfactory. However, the US Authorities (FCC) have recently introduced a regulation that requires the location of a mobile station within a cell or cell sector to be pinpointed within 125 meters when that mobile station makes a call to one of the emergency services. Several methods have been proposed for locating the position of the mobile station within a cell or cell sector. One method uses the principle of time difference of arrival (TDOA). With the time difference of arrival method, a signal from one mobile station is received by a plurality of base transceiver stations. By an observing the difference in time required for a given signal from a given mobile station to arrive at the plurality of base transceiver stations, it is possible to determine the location of the mobile station. However, this method can not be used if the signal from a mobile station only can be received by a single base station. Additionally, there are difficulties associated with the provision of the required timing signal at each of the base transceiver stations in order to determine the time difference.

In an alternative method which has been proposed, timing advance information is used. Timing advance information is required in time division multiple access (TDMA) cellular networks. In time division multiple access cellular networks, a plurality of time slots is used. A frame is made up of a predetermined number of time slots. Each mobile station will be allocated a given time slot in each frame in which to communicate with a base transceiver station. However, when the mobile station is relatively far from the base transceiver station, the signal will take longer to travel to the base transceiver station as compared to when the mobile station is relatively close to the base transceiver station.

In order to process correctly the signals received from various mobile stations, the signal from each mobile station must be received within its allocated time slot at the base transceiver station. To ensure that the signals are received within the allocated time slots the base station will provide the mobile station with timing advance information. This information indicates when the mobile station should transmit its signal to the base transceiver station. Accordingly, when the mobile station is relatively far from the base transceiver station, the mobile station will send its signal to the base station earlier than if the mobile station is relatively close to the base station. The signal transmitted by the mobile station will therefore be received by the base transceiver station in its allocated time slot. The timing advance information is thus a measure of the distance between the mobile station and the base station. However, this system is not accurate if information from only one base station is available. Furthermore, this method does not provide any indication as to the direction from which a signal has been received. This method can be improved if timing advance information from two base stations is considered. However, there are again problems associated with the provision of the required timing signals.

BRIEF SUMMARY OF THE INVENTION

It is therefore an aim of certain embodiments of the present invention to reduce or at least mitigate these problems.

According to one aspect of the present invention, there is provided a Doppler direction finder comprising:
- at least one antennae spaced from a rotation point, said antenna arranged in use, to be rotated about said rotation point, said at least one antenna being arranged to provide a first output signal comprising a signal received by said at least one antenna combined with a Doppler shift component;
- means for providing a second output signal comprising said received signal without said Doppler shift component;
- means for processing said first and said second signals to obtain said Doppler shift component; and
- means for determining from said Doppler shift component the direction from which said received signal is received.

By processing the first and second signals, the modulation component of any received signal may be cancelled. Accordingly, it has been found that this arrangement may permit the detection range of the Doppler direction finder to be increased and also may allow more accurate results. The Doppler direction finder embodying the present invention does have the advantage of a quick settling time making it particularly useful in radio telecommunications networks.

In the case where the at least one antenna physically rotates, satisfactory results may be obtained. However if the at least one antenna is electronically rotated, then at least three antennae may be provided. Preferably between 3 and 10 antennae may be provided but good results may be obtained with between 4 and 8 antennae.

Preferably the means for providing a second output signal comprises a further antenna. This further antenna may have an axis which passes through the rotation point. The further antennae may be at the same level as the at least one rotating antenna or alternatively may be above or below the at least one antennae. This feature has the advantage that the signal received by the further antenna may be very similar to the signal which will be received by the at least one rotating antenna, but without the Doppler shift components. The further antenna is preferably substantially stationary although in some embodiments the further antenna may be rotating about its own axis.

In an alternative embodiment, the means for providing a second output signal comprises means for combining a plurality of signals from the at least one antenna to provide said second output signal. This has the advantage that a separate antenna is not required for the second signal. Additionally, in those embodiments where a plurality of rotating antennae are provided, the problems associated with signal fading can be reduced in that the signal is received by more than one antenna. The combining of the signals is such that any Doppler shift components are cancelled.

Preferably, the received signal comprises a modulated carrier wave. The modulation applied to the carrier wave may be Gaussian minimum shift key modulation. Accordingly, the Doppler direction finder may be usable in cellular communication networks. The cellular communication network may be a time division multiple access network.

The at least one antenna is arranged, in use, to be rotated at least once in a time slot of the time division multiple access network. Preferably, the at least one antenna rotates at least twice in the time slot and the direction is determined from the signal received in the middle region of the time slot. Thus, anomalies caused by readings at the beginning and end of the time slot can be ignored.

According to a second aspect of the present invention, there is provided a Doppler direction finding method comprising the steps of:

rotating at least one antenna about a rotation point to provide a first output signal comprising a received signal combined with a Doppler shift component;

providing a second output signal comprising the received signal without said Doppler shift component;

processing the first and second signals to obtain the Doppler shift component; and determining from the Doppler shift component the direction from which a signal has been received.

According to a third aspect of the present invention, there is provided a method of locating a mobile station in a cell of a time division multiple access cellular communication network comprising the steps of:

determining the direction from which a signal transmitted by said mobile station is received using a Doppler direction finder as defined hereinabove;

determining the distance between the mobile station and the base station using timing advance information; and determining the location of the mobile station using said determined distance and determined direction.

This method has the advantage that no complicated reference clock signals are required even if determination of location made at two or more base stations are taken into account.

BRIEF DESCRIPTION OF THE SEVERAL VIEWS OF THE DRAWINGS

For a better understanding of the present invention and as to how the same may be carried into effect, reference will now be made by way of example to the accompanying drawings in which:

FIG. 2 shows schematically a signal source and the antennae of FIG. 1;

FIG. 3a shows a graph of change in frequency against time for the rotating antennae of FIG. 1;

FIG. 3b shows a graph of change in phase against time for the rotating antennae of FIG. 1;

DETAILED DESCRIPTION OF THE INVENTION

Figure 1:
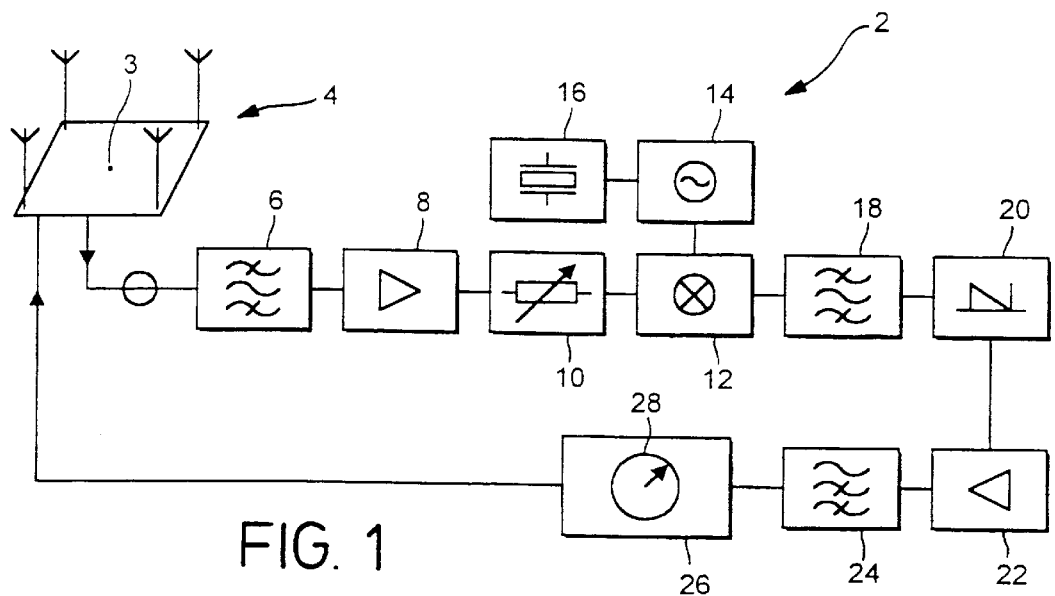
FIG. 1 shows a block diagram of a known Doppler direction finder.

FIG. 1 illustrates a known Doppler direction finder 2 which will be described to assist in the understanding of the present invention. The Doppler direction finder 2 is arranged to process amplitude modulated (am) or frequency modulated (fm) signals in order to determine the direction from which those signals are received. The Doppler direction finder 2 has four rotating antennae 4 which are arranged either physically or electronically to rotate about a central point 3. The four antennae 4 are arranged in a square configuration. The antennae 4 have a rotational speed which is selected as desired.

Before describing the remaining elements of FIG. 1, reference will now be made to FIG. 2 which illustrates the Doppler shift principle used by the Doppler direction finder 2 of FIG. 1 in order to determine the direction from which a signal has been received. For simplicity, it will be assumed that the antennae 4 are physically rotating about the central point 3. In FIG. 2, the source 5 of a fm or am signal is positioned some distance from the four antennae 4. The antennae 4 are rotating in the direction of arrow 7 about the central point 3. When an antenna is generally in position a shown in FIG. 2, the instantaneous component of the antennae will be in the direction of arrow A. The velocity component of the antenna when in position a is thus perpendicular to the general direction 9 in which the signal from the source 5 travels. Accordingly, the signal received by the antennae 4 when in position a will have no Doppler shift component.

As is well known, the Doppler shift effect is observed when there is relative movement between a signal source and a receiver. When the signal source and receiver are moving towards each other, the frequency of the signal received by the receiver is increased as compared to the frequency of the signal transmitted by the signal source. Conversely when the signal source and receiver are moving away from each other, the frequency of the signal received by the receiver is reduced as compared to the frequency of the signal transmitted by the signal source.

When an antenna is in position b, which is at 900 with respect to position a, the antenna will be travelling away from the source 5 in the direction of arrow B. The antenna 4, when in position b, is thus travelling away from the source 5 in the same direction in which the signal from the source 5 travels to the antennae 4. Accordingly, there will be a maximum decrease in the frequency of the signal received by the antenna when in position b. This is a result of the Doppler shift effect described hereinbefore.

When an antenna 4 is in position c, 90° with respect to position b, the antenna 4 has a velocity component in the direction of arrow C. As with the case when the antenna is in position a, the velocity component of the antenna when in position c is at right angles to the direction in which the signal from the source 5 is received. Accordingly, there is no Doppler shift component when the antenna is in position c.

When an antenna is in position d, the antenna 4 has a velocity component in the direction of arrow D which is towards the source 5. Accordingly, the signal from the source 5 is received with a maximum increased frequency due to the Doppler shift effect. It should be appreciated that the Doppler shift effect will be observed when the antenna is in positions other than the four positions described. However, the Doppler shift observed will be between the maximum shift values observed when the antenna is in positions b and d and the zero shift value observed when the antenna is in positions a or c.

Reference is made to FIG. 3a which shows a graph of change in frequency against time for one of the rotating antenna. The position of the antenna at which the corresponding change in frequency values have been obtained are also shown in FIG. 3a. As can be seen, the frequency of the signal received by the antenna is at its minimum when the antenna is in position b whilst the frequency of the received signal is at its maximum when the antenna is in position d. It should be appreciated that in order to obtain the graph shown in FIG. 3a, signal information from all four of the antennae are combined. The frequency of the Doppler shift is equal to the frequency of rotation of the antennae.

FIG. 3b shows a graph of change in phase of the received signal against time. It should be appreciated that the relationship between the change in frequency and the change in phase is as follows:

$$\frac{d}{dt}(\phi) = f \quad \text{where } \phi = \text{phase}$$

By identifying the actual angular position a, it is possible to determine the direction from which the signal from source 5 has been received. The circuitry shown in FIG. 1 is arranged to process the received signal in order to determine point a.

Referring back to FIG. 1, the Doppler direction finder 2 has a first band pass filter 6. The desired signal which is received by the antennae 4 will be within a defined band, even allowing for the Doppler shifting of the received signal.

The band pass filter 6 is arranged to filter out unwanted signals which do not fall within the defined band. The signal which is output by the band pass filter can be regarded as being:

(fc+mod)±df, where fc is the frequency of carrier wave, mod is the modulation component and df is the Doppler shift. The filtered signal output from the first band pass filter 6 is input to an amplifier 8. The amplifier 8 has associated therewith a variable resistor 10. The amplifier 8 in combination with the variable resistor 10 defines an automatic-gain-control (AGC) circuit in which the gain of the amplifier 8 is adjusted to keep the output within a linear range. The output of the AGC defined by the amplifier 8 and variable resistor 10 is input to a mixer circuit 12. The mixer circuit 12 also has an input from a voltage controlled oscillator 14. The frequency at which the oscillator 14 oscillates is controlled by a crystal 16. The oscillator 14 is tuned to a frequency fk. The mixer 12 produces an output that is equal to the difference between the received signal (fc+mod)±df and the frequency produced by the oscillator fk. The resulting signal frequency is:

(fc−fk+mod)±df.

fc−fk is equal to fb which is the baseband frequency. As is well known, the baseband frequency fb is the frequency at which the input signal can be processed.

The output of the mixer 12, (fb+mod)±df, is input into a second band pass filter 18 which is arranged to filter out any unwanted frequencies which might have arisen from the signal processing carried out by the mixer 12. In particular, the mixer 12 also provides a signal which is the sum of the two input signals. The filter 18 is arranged to filter out the signal resulting from this summing. The output of the second band pass filter 18 is connected to the input of a demodulator 20, as the signal output from the mixer 12 still includes a modulation component. The output of the demodulator will be fb±df. The output of the demodulator 20 is amplified by a second amplifier 22. The output of amplifier 22 is connected to a high-pass filter 24. In practice, the fb part of the signal is filtered out by one or more of the following components: band pass filter 8, demodulator 20, amplifier 22 and high pass filter 24.

The signal input to the control unit 26 can be regarded as being the signal shown in FIG. 3b ie. just df. The control unit 26 is arranged to ascertain the zero crossing point of the df component of the signal, that is the actual angular position of point b or d relative to a reference point. As will be appreciated, the actual angular position of positions a to d will vary depending on the direction from which the signal is received from the source. However, in order to obtain the actual angular direction from which the signal has been received, the actual angular position of point a has to be determined. This is achieved by adding or subtracting 90° from the previously determined actual angular position for point b or d. The information as to the direction from which it is determined that a signal has been received may, for example, be displayed on a display 28.

The control unit 26 also has an output which is connected to the four antennae 4 to control the operation thereof including the speed of rotation thereof.

Figure 4:
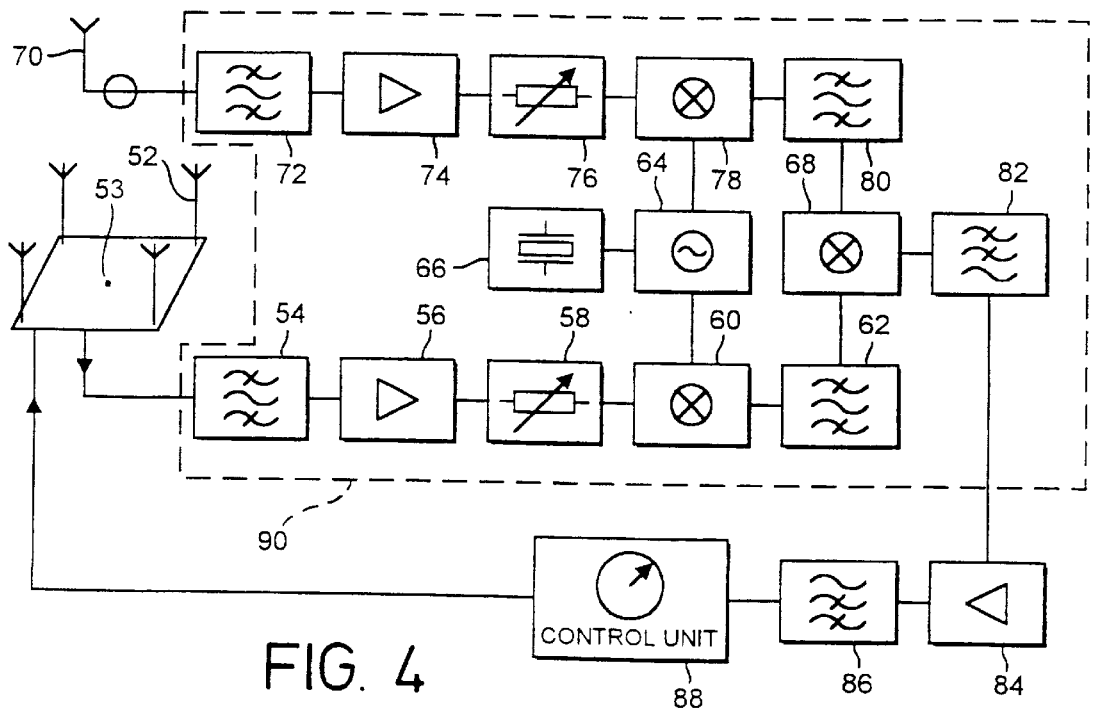
FIG. 4 shows a block diagram of a Doppler direction finder embodying the present invention which illustrates in detail the receiver.
Figure 5:
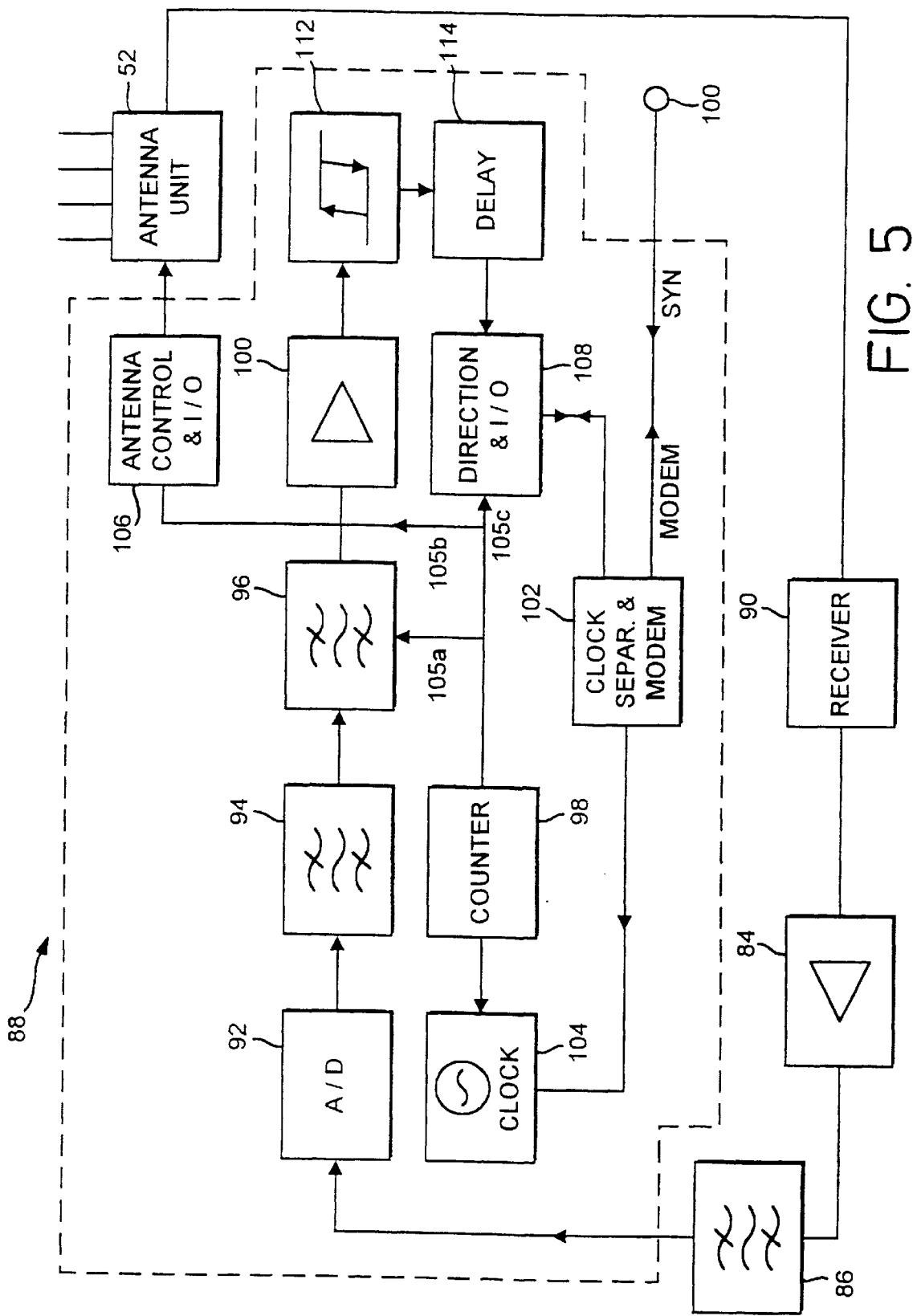
FIG. 5 shows a block diagram of the Doppler direction finder of FIG. 4 which illustrates in detail the control unit.

However, the Doppler direction finder described in relation to FIG. 1 is not suitable for dealing with signals which use complex modulation such as GMSK (Gaussium minimum shift keying) as used in GSM, DCS1800 and PCS1900 cellular telecommunications systems. The more complex types of modulation result in a reduction in the accuracy of the known Doppler direction finder as well as a reduction in the detection range. Additionally, the time taken for a conventional Doppler direction finder to determine the direction from which a signal has been received increases if the signal has complex modulation. This makes the conventional Doppler finder unable to deal with a large number of signals from different sources and thus unsuitable for cellular communication networks. Reference will now be made to FIGS. 4 and 5 which show a Doppler direction finder embodying the present invention for use in a time division multiple access cellular telecommunications network such as GSM, DCS1800 and PCS1900. It should be appreciated that similar principles to those described in relation to FIG. 1 also apply to the embodiment of the present invention.

Before describing the Doppler direction finder 50 embodying the present invention, various features of a time division multiple access (TDMA) system will be briefly described. Typically, TDMA systems utilise digital signals. The signals transmitted from and received by a base station are divided into a number of frames and each frame is in turn divided into a number of time slots, for example eight. Thus eight time slots constitute one frame. One of the time slots may be used for traffic control signals while each of the remaining seven time slots will be allocated for communication with seven mobile stations which are in a cell or cell sector associated with the particular base transceiver station.

Figure 6:
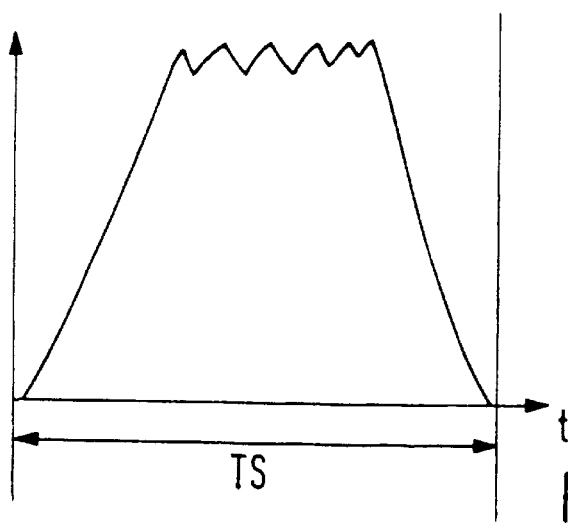
FIG. 6 shows a typical signal received in one time slot from a mobile station.
Figure 7:
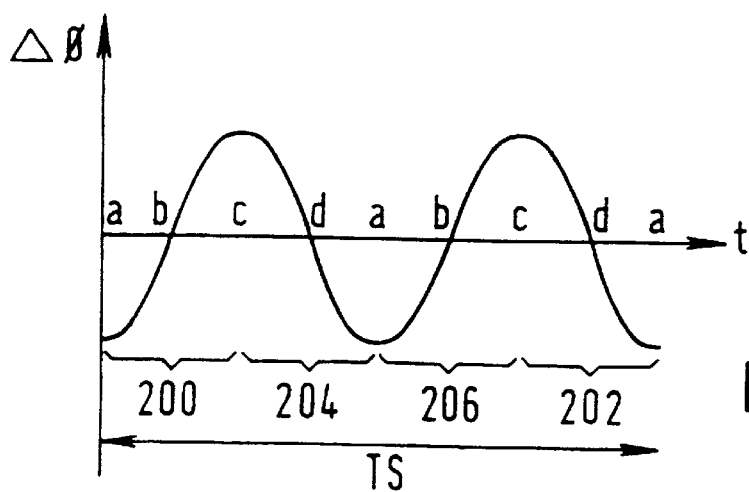
FIG. 7 shows an example of a graph of change in phase against time obtained when the antennae are rotated twice in a time slot.

As with the known arrangement, the Doppler direction finder 50 shown in FIGS. 4 and 5 comprises four antennae 52 arranged to rotate electronically about a central point 53. As is known, where a plurality of antennae are arranged to rotate electronically, the antennae themselves do not move but the rotation of the antennae is simulated by selectively taking readings from the antenna and processing them appropriately. Hard switching or soft switching may be used. Hard switching is where only one antenna is selected at one time. Soft switching is where more than one antenna is on at the same time. The arrangement may be such that the signal from one antenna is stronger than the signal from other of the antenna. The antennae 52 are arranged so as to rotate completely at least once in each time slot. It is preferred that the antennae rotate n times in each time slot where n is an integer. As will be described hereinafter, in one preferred embodiment, the antennae 52 are arranged to rotate twice in each time slot. The rotation frequency of the antennae is defined as follows:

number of time slots×frequency of time slots×no of antennae×no of rotations in a time slot Reference is made to FIG. 6 which shows a typical signal transmitted by a mobile station and received in one time slot TS by the base transceiver station. As can be seen, there are regions at the beginning and end of the time slot where the signal received by the base transceiver station is ramping up and ramping down respectively. Accordingly, it is desirable to make the measurements in order to determine the direction of the mobile station in the middle region of the time slot in order to avoid any anamolous readings. Therefore, in one embodiment of the present invention, the four antennae 52 are arranged to rotate completely twice in each time slot. This will give rise to results as shown in FIG. 7. Accordingly, the first half 200 of the signal resulting from the first rotation of the antennae 52 and the second half 202 of the signal resulting from the second rotation of the antennae 52 are ignored and only the second half 204 of the signal resulting from the first rotation of the antennae 52 and the first half 206 of the signal resulting from the second rotation of the antennae 52 are considered.

The antennae 52 are typically spaced apart by a distance of around one quarter of a wavelength. Any other suitable spacing can of course be used. The output of the antennae 52 is input to a first band pass filter 54 which provides an output to a first amplifier 56 and first variable resistor 58. The first band pass filter 54, first amplifier 56 and first variable resistor 58 provide the same function as the first band pass filter 6, first amplifier 8 and variable resistor 10 described in relation to FIG. 1. Typically, the band pass filter 54 will be tuned to the appropriate band used for the cellular communications network. For example, in a GSM network, the frequency will be around 800 MHz. In a DCS system, the frequency will be around 1800 MHz and in a PCS system around 1900 MHz.

The signal provided by the antennae 52 can be regarded as being (fc+mod)±df. df is the Doppler frequency shift and is very much less than fc+mod. mod represents the modulation and fc the carrier frequency. The output of the variable resistor 58 is connected to the input of a first mixer 60. The first mixer 60 also has an input from a voltage controlled oscillator 64. The frequency of oscillation of the voltage controlled oscillator is controlled by a crystal 66. The oscillator 64 provides a signal at a frequency equal to fc+fb. fb is the base band frequency. The output of the first mixer 60 is thus equal to ((fc+mod)±df)−(fc+fb)=mod±df−fb. The output from the first mixer 60 then passes through a second band pass filter 62 which is arranged to remove any unwanted frequency components falling outside a defined range. These unwanted components may arise as a result of the processing carried out by the first mixer 60. As with the arrangement described in FIG. 1, the first mixer 60 also provides a signal which is is the sum of the two input signals. The filter 60 will filter out the signal resulting from the summing. The output of the second band pass filter 62 is connected to the input of a second mixer 68.

The Doppler direction finder 50 also comprises a further antenna 70. The further antenna 70 is a fixed, non rotating antenna, the axis of which passes through the centre 53 of the four rotating antennae 52. The fixed antenna 70 may be arranged, in one embodiment, above or below the four rotating antenna. However, in an alternative embodiment, the fixed antenna 70 is arranged in the middle of the four rotating antennae 52. The fixed antenna 70 provides on its output the signal fc +mod. In other words the signal provided by the output of the fixed antenna 70 differs from the signal on the output of the rotating antennae 52 only in that the Doppler shift component is not present. As the fixed antenna 70 is not rotating, there is no Doppler shift component, df. The signal received by the fixed antenna 70 is input to a third filter 72 which has the same or similar characteristics as those of the first band pass filter 54 connected to the four rotating antennae 52. It should be noted that it is not necessary that the first band pass filter 54 and the third band pass filter 72 be exactly matched. The third band pass filter 72 performs the same function as the first band pass filter 54 but in respect of the signal received by the fixed antenna 70.

The output of the third band pass filter 72 is connected to the input of a second amplifier 74 which itself is connected to a second variable resistor 76. As with the first amplifier 56and the first variable resistor 58 connected to the four rotating antennae 52, the second amplifier 74 and second variable resistor 76 provide an automatic gain control (AGC) circuit. The second amplifier 74 has generally the same characteristics as the first amplifier 56. Likewise, the first variable resistor 58 has generally the same characteristics as the second variable resistor 76. Again, it should be appreciated that the first amplifier 56 and first variable resistor do not have to be matched exactly to the second amplifier 74 and second variable resistor 76 but preferably have similar characteristics.

The output of the second variable resistor 76 is connected to the input of a third mixer 78. The third mixer 78 also receives an input from the voltage controlled oscillator 64 which provides an input of fc+fb. The output of the third mixer 78 is thus: (fc+mod)−(fc+fb)=mod−fb. Again, it is preferred that the characteristics of the third mixer 78 be similar to those of the first mixer. The output of the third mixer 78 is connected to the input of a fourth band pass filter 80 which removes unwanted frequency components resulting from the signal processing carried out by the third mixer 78 which fall outside the desired band, such as any signal resulting from the summing of the two signals input to the mixer 78. Once again, the fourth band pass filter 80 has similar characteristics to those of the second band pass filter 62. The output of the fourth band pass filter 80 is connected to an input of the second mixer 68. The second mixer 68 thus receives one input of:

$$mod+df-fb$$

from the second band pass filter 62 and a second input of:

$$mod-fb$$

from the fourth band pass filter 80. The second mixer 68 thus provides an output of ±df which is input to a low pass filter 82 which filters out any signals resulting from the summing of the signals input to the mixer 68. As the modulation component of the received signals cancel, there is no need to provide a demodulator as with the arrangement shown in FIG. 1. The output of the second mixer 68 will generally have the format of the graph shown in FIG. 3b.

The output of the low pass filter 82 is connected to an amplifier 84 which in turn is connected to a high pass filter 86. The output of the high pass filter 86 is connected to a control unit 88 which, from the received input is able to determine the direction from which the signal is received from the source. The control unit 88 uses the principle illustrated in relation to FIGS. 2, 3a and 3b in order to determine the direction of the mobile stations. As with the known arrangement, the output of the control unit 88 is connected to the four rotating antennae 52.

Reference will now be made to FIG. 5 which shows in more detail the construction of the control unit 88. It should be appreciated that in FIG. 5, receiver 90 corresponds to those components shown in dotted lines and marked with reference numeral 90 in FIG. 4.

The output of the high pass filter 86 is input to an analogue to digital (A/D) converter 92 which converts the input signal, which is in analogue form into digital form. The output of the analogue to digital converter 92 is input to fifth and sixth band pass filters 94 and 96. The fifth band pass filter 94 is provided to cancel the sampling rate frequency used by the analogue to digital converter 92. The sixth band pass filter 96 is a switched capacitor filter which has an input from a counter 98. The input from the counter 98 provides the clock signal for controlling the switched capacitor filter 96 and, in particular, the band width thereof.

The control unit 88 also has a synchronizing input 100 which allows a synchronizing signal to be input into the control unit 88. That signal can be a frame synchronizing signal or a time slot synchronizing signal. As previously outlined, a typical TDMA system will use frames, each of which is divided into a plurality of time slots. At, for example, the beginning of each frame a signal may be produced which may be used as the synchronising signal. It should be appreciated that the timing of the frames themselves is controlled by a clock within the base station. Alternatively or additionally, a signal may be provided, for example, at the beginning of each time slot. This may be used as the synchronizing signal. It is possible in an alternative embodiment of the present invention that an independent synchronizing signal be provided.

The synchronizing signal input 100 is connected to block 102 which provides two functions. The first function of the block 102 is to separate the synchronizing signal from its carrier signal. The second function of the clock separation and modem block 102 is to place an output signal from the control circuit 88 onto a clock signal carrier to provide a modem signal or internet signal to thereby provide an output from the control circuit 88. The input 100 therefore also serves as an output to a modem. A second output of the block 102 is connected to a clock block 104 which thus receives the input synchronizing signal. The input synchronizing signal is processed by the clock block 104 to provide a clock signal. The output of the clock block 104 is connected to a counter 98 which is controlled by the clock signal. As can be seen from FIG. 5, the counter 98 has three outputs. The first output 105a is to the switched capacitor filter 96. As mentioned previously, the output 105a from the counter 98 provides the clock signal for controlling the switched capacitor filter 96 and in particular the band width thereof. The second output 105b from the counter is to an antenna control unit 106. The antenna control unit 106 controls the speed of electronic rotation of the four rotating antennae 52. The final output 105c from the counter 98 is connected to a direction and input/output block 108 which will be described in more detail hereinafter.

The output of the switched capacitor filter 96 is connected to the input of an amplifier 110. The output of the amplifier 110 is connected to decision making block 112 which is arranged to determine the location of the zero crossing point of the signal shown in FIG. 3b. However, as the position of the zero crossing point is at 90° with respect to the direction from which the signal is received, a delay block 114 is provided which adds or subtracts 90° to the value determined by decision making block 112. The output of the delay block 108 is connected to direction block 108 which is able to determine based on the input received by the delay block 108 and information received from the counter 98 the direction from which a signal is received. The input from the counter 98 enables the input/output block 108 to determine the actual position of the antenna when the zero crossing point plus or minus the 90° delay occurs. This is because the electronic rotation of the antennae 52 is also controlled by the counter. Thus, the actual position relative to a reference point, of the antennae 52 when a given event occurs is known. The input/output block 108 can therefore determine the count number when the zero crossing point plus or minus 90° occurs and hence the actual corresponding angular position of the antenna 52. The input/output block 108 may also take into account the delays which result from the time taken for the received signal to travel from the antennae 52 to the input/output block 108.

The input/output block 108 may include a buffer which is arranged to store the determined direction for n previous time slots for a given mobile station. In this way, any anomalous readings can be ignored. For example, if due to multipath propagation, a signal is received in a current time slot from a direction which is very different from the x previous time slots, it can be assumed that the current reading is due to multipath propagation and does not represent the actual direction in which the mobile station is located. Accordingly, such a reading can be ignored for the purposes of locating the mobile station and instead reliance will be placed on the reading or readings obtained in one or more previous time slots. The output of the input/output block 108 is input to block 102 which places the direction information onto a modem signal to provide an output as described above.

Using the Doppler direction finder shown in FIGS. 5 and 6, it is possible to locate the direction from which a signal is received. However the Doppler direction finder 50 does not provide information as to the distance of the mobile station from the base station. Accordingly, in order to locate the position of the mobile station, timing advance information is used. As mentioned previously, the base transceiver station (BTS) allocates a particular time slot to a mobile station and the signal which is transmitted by the mobile station (MS) has to fall within that time slot. However, when the mobile station is relatively far from the base station, the signal which is sent by the mobile station will take a longer time to travel to the base transceiver as compared to the situation where the mobile station is relatively close to the base transceiver station. Accordingly, the signal which the base transceiver station receives from the mobile station, when relatively far from the BTS, may not be entirely received in the allocated time slot. If the signal transmitted to the mobile station is not entirely received in its allocated time slot, it may interfere with the signal received from another mobile station in an adjacent time slot. To deal with this difficulty, the BTS will make an assessment as to the distance between the BTS and the mobile station. Based on this assessment, the BTS calculates timing advance information which is then used by the mobile station. This timing advance information will indicate to the mobile station when it should send its signal to the BTS in order for it to be received by the BTS in its allocated time slot. Thus, when the MS is relatively far from the BTS, the MS will send its signal to the BTS earlier than if the distance between the MS and BTS is relatively small so as to ensure that the signal transmitted by the mobile station is received by the BTS in its allocated time slot. The timing advance information thus is a measure of the distance between the BTS and the mobile station whilst the Doppler direction finder provides an indication as to the direction of the mobile station. Using this information, it is possible to locate the mobile station from which a signal is received typically to an accuracy of less than 125 meters.

The accuracy of the system can be further improved if a signal from the mobile station can be received by more than one base station, each of which incorporates a Doppler direction finder embodying the present invention. Thus, at each base station, a determination is made as to the likely location of the mobile station. By using this information from two or more of the base transceiver stations, the accuracy of the system is improved. If this latter method is used a master controller which is able to control the plurality of base stations is required in order to use the information from each of the base stations to determine the location of a given mobile station. Typically, with only one base station, a mobile station could be located with an accuracy of ±2°±800 m. If two base stations are used then the accuracy is ±2°±120 m. It should be appreciated that these values will vary in dependence on the characteristics of the particular communications network and also the size of the cells.

Figure 8:
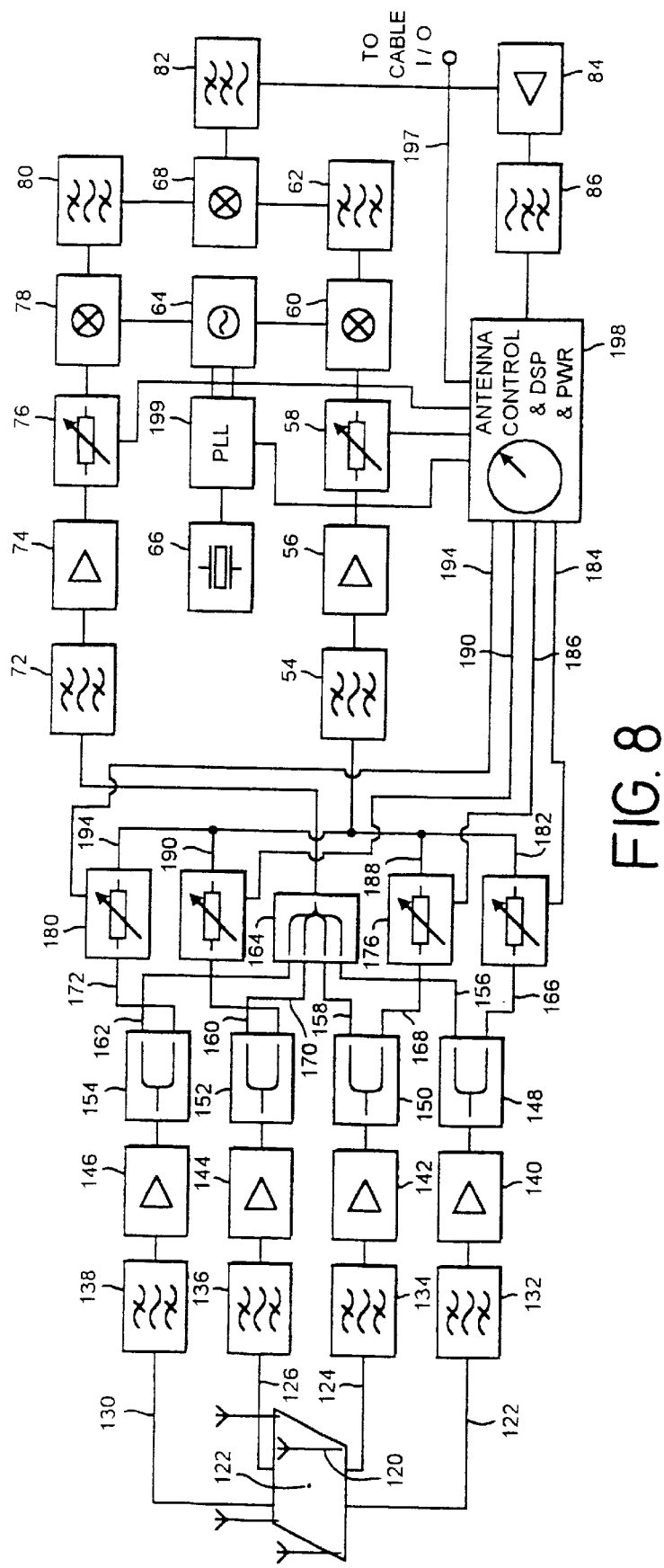
FIG. 8 shows a block diagram of an alternative Doppler direction finder embodying the present invention.

Reference is now made to FIG. 8 which shows an alternative embodiment of the present invention. These components which are the same as the components of the first embodiment are marked by the same reference numeral.

As with the first embodiment, the arrangement comprises four electronically rotatable antennae 120 which rotate about a common centre point 122. There are four separate outputs 124, 126, 128 and 130 provided from the antenna arrangement. In particular, each antenna 120 has its own separate output 124–130. Each output 124–130 is input to a separate band pass filter 130, 132, 134 and 136. The respective output of each band pass filter 130–136 is input to its own amplifier, 140, 142 and 144 and 146 respectively where the respective signal is amplified. The output of each amplifier 140 to 146 is input to a respective Wilkinson Fork 148, 150, 152 and 154 which splits the output of each amplifier 140 to 146 into two signals and isolates those two signals from each other.

One output 156, 158, 160 and 162 of the respective Wilkinson Fork 148 to 154 is input to a single signal combiner 164 which provides a single output. The single output of the combiner 164 is equivalent to the output provided by the single antenna 70 of the first embodiment, that is fc +mod. By using the four antenna to provide the received signal without the Doppler shift component as compared to the single antenna 70 of the first embodiment of the present invention, the problems resulting from signal fading are reduced. It should be appreciated that the signals from the four antennae 120 are combined in such a way that the Doppler shift components are cancelled.

The other output 166, 168, 170 and 172 of each Wilkinson Fork 148–154 is input to a respective variable resistor 174, 176, 178 and 180. The variable resistors 174–180 can be regarded as adjustable attenuators which are used to control rotation of the antenna. In particular, with electronic rotation of the antennae using soft switching, the variable resistors can be used to vary the attenuation of the respective signals which are on at the same time.

Each variable resistor 174–180 has two outputs 182–196. The first output 182, 186, 190, 194 of each variable resistor 174–180, is input to a control unit 198 which is similar in its construction to the control unit 88 of the first embodiment. The other outputs 184, 188, 192, 196 of each variable resistor are combined and input to first band pass filter 54 which performs a similar function to the first band pass filter 54 of the first embodiment. The output of the combiner 164 is input to a third band pass filter 72 which provides a similar function to that of the third band pass filter 72 of the first embodiment. Those components which are the same as those components of the first embodiment shown in FIG. 4 are not described further.

A phase lock loop 199 is provided between the voltage controlled oscillator 64 and its associated crystal 66 to ensure that the voltage controlled oscillator 64 keeps to one channel. The control unit 198 has outputs to the first variable resistor 58 and the second variable resistor 76 to control the gain of the respective amplifiers 56 and 74. The control unit also has an output to control the phase lock loop 199 to control the channel thereof. The control unit has an input/output 197 which corresponds to input/output 100 of the first embodiment.

Figure 9:
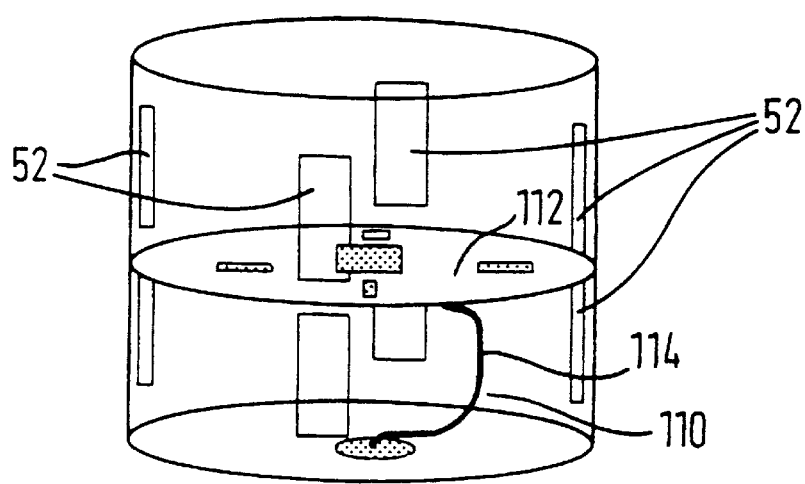
FIG. 9 shows a preferred arrangement for the antennae of FIG. 8.

Reference is now made to FIG. 9 which shows a preferred implementation for the four antennae 52. A flexible circuit board 110 is provided on which each of the four antennae elements 52 are etched. After the antennae elements 52 have been etched onto the flexible circuit board, the flexible circuit board is bent to define a cylinder. A further circuit board 112 is provided in the middle of the cylinder. At least some of the receiver components are provided on this further circuit board 112. Those further components may be etched onto the further circuit board 112. The inputs for the various receiver components provided on the circuit board are soldered to the outputs 114 of the antennae 52. The arrangement can be modified to also include the stationary antenna 70 of the first embodiment.

It should be appreciated that the number of electronic rotating antennae need not be four but can be anything from 3 to 16 antennae. Each of the antennae, which rotates, is preferably omni-directional. The antennae 52 may be physically rotated about the centre point 53 but in a preferred embodiment are electronically rotated. In a preferred embodiment of the invention, where the antennae are electronically rotated, readings are taken from each antenna in turn. With soft switching, readings will in practice be taken from more than one antenna at the same time. However, the attenuation of the respective signals from the antennae may be controlled by the resistors of FIG. 8. In one embodiment of the invention, four antenna are provided which are each turned on 90 times for a complete rotation of the antennae arrangement. However this number can be varied to be any other suitable number. If an antenna is physically rotated then embodiments of the invention can be implemented with a single rotating antenna.

It should be appreciated that in one modification to the present invention, the Doppler direction finder is used in an SDMA (space division multiple access) system in order to determine the direction from which a signal has been received from a mobile station and hence the direction in which a signal should be transmitted to the BTS.

Embodiments of the invention can also be used in FDMA systems (frequency division multiple access), analogue systems or any other suitable system.

In one embodiment of the invention, the second mixer is replaced by a combiner with a phase shifter. However, mixers are simpler and hence more economic and are therefore preferred.

The antennae used in embodiments of the present invention can have any suitable construction, and may for example be omnidirectional antenna. In one embodiment of the invention, the antennae are dipole antennae whilst in another embodiment of the invention the antennae are discone antennae.

It should be appreciated that embodiments of the present invention can also be used in arrangements with amplitude or frequency modulated signals. Indeed embodiments of the present invention are suitable for processing signals having a wide range of different types of modulation.

The single antenna of the first embodiment is described as being stationary. However in some embodiments, this antenna can move provided that no Doppler shift components arise or the Doppler shift components which do arise cancel.

What is claimed is:

1. A Doppler direction finder comprising:
   at least one antenna spaced from a rotation point, said at least one antenna arranged in use, to be rotated physically or electronically about said rotation point, said at least one antenna being arranged to provide a first output signal comprising a signal received by said at least one antenna combined with a Doppler shift component;
   circuitry for providing a second output signal comprising said received signal without said Doppler shift component;
   circuitry for processing said first and said second signals to obtain said Doppler shift component, said received signal comprising a modulated carrier wave and said processing circuitry being arranged to combine said first and second signals to cancel the modulation component of the received signal; and
   circuitry for determining from said Doppler shift component the direction from which said received signal is received.

2. A Doppler direction finder as claimed in claim 1, wherein at least three antennae are provided.

3. A Doppler direction finder as claimed in claim 1, wherein said circuitry for providing a second output signal comprises circuitry for combining a plurality of signals from said at least one antenna to provide said second output signal.

4. A Doppler direction finder as claimed in claim 1, wherein the processing circuitry is arranged to isolate said Doppler shift component from said received signal.

5. A Doppler direction finder as claimed claim 1, wherein the modulation applied to the carrier wave is Gaussian minimum shift key modulation.

6. A Doppler direction finder as claimed in claim 1, wherein said Doppler direction finder is usable in a cellular communication network.

7. A Doppler direction finder as claimed in claim 6, wherein said cellular communication network is a time division multiple access network.

8. A Doppler direction finder as claimed in claim 7, wherein said at least one antenna is arranged, in use, to be rotated at least once in a time slot of said time division multiple access network.

9. A Doppler direction finder as claimed in claim 7, wherein said at least one antenna rotates at least twice in said time slot and direction is determined from the part of the signal received in a middle region of said time slot.

10. A Doppler direction finder as claimed in claim 1, wherein said at least one antenna is provided on a circuit board.

11. A Doppler direction finder as claimed in claim 10, wherein said circuit board is arranged in the form of a cylinder.

12. A Doppler direction finder as claimed in claim 11, wherein a further circuit board is provided inside said cylinder to support at least part of the Doppler direction finder.

13. A Doppler direction finder comprising:
    at least one antenna spaced from a rotation point, said at least one antenna arranged in use, to be rotated physically or electronically about said rotation point, said at least one antenna being arranged to provide a first output signal comprising a signal received by said at least one antenna combined with a Doppler shift component;
    a further antenna for providing a second output signal comprising said received signal without said Doppler shift component;
    circuitry for processing said first and said second signals to obtain said Doppler shift component, said received signal comprising a modulated carrier wave and said processing circuitry being arranged to combine said first and second signals to cancel the modulation component of the received signal; and
    circuitry for determining from said Doppler shift component the direction from which said received signal is received.

14. A Doppler direction finder as claimed in claim 13, wherein at least three antennae are provided.

15. A Doppler direction finder as claimed in claim 13, wherein said further antenna has an axis which passes through said rotation point.

16. A Doppler direction finder as claimed in claim 13, wherein said further antenna is substantially stationary.

17. A Doppler direction finder as claimed in claim 13, wherein the processing means is arranged to isolate said Doppler shift component from said received signal.

18. A Doppler direction finder as claimed in claim 13, wherein the modulation applied to the carrier wave is Gaussian minimum shift key modulation.

19. A Doppler direction finder as claimed in claim 13, wherein said Doppler direction finder is usable in a cellular communication network.

20. A Doppler direction finder as claimed in claim 19 wherein said cellular communication network is a time division multiple access network.

21. A Doppler direction finder as claimed in claim 20 wherein said at least one antenna is arranged, in use, to be rotated at least once in a time slot of said time division multiple access network.

22. A Doppler direction finder as claimed in claim 20 wherein said at least one antenna rotates at least twice in said time slot and direction is determined from the part of the signal received in a middle region of said time slot.

23. A Doppler direction finder as claimed in claim 13 wherein said at least one antenna is provided on a circuit board.

24. A Doppler direction finder as claimed in claim 23 wherein said circuit board is arranged in the form of a cylinder.

25. A Doppler direction finder as claimed in claim 24 wherein a further circuit board is provided inside said cylinder to support at least part of the Doppler direction finder.

26. A Doppler direction finding method comprising the steps of:
rotating at least one antenna about a rotation point to provide a first output signal comprising a received signal combined with a Doppler shift component;
providing a second output signal comprising the received signal without said Doppler shift component;
processing the first and second signals to obtain the Doppler shift component, said received signal comprising a modulated carrier wave and said processing step combines the first and second signals to cancel the modulation component of the received signal.

27. A method of locating a mobile station in a cell of a time division multiple access cellular communication network comprising the steps of:
determining the direction from which a signal transmitted by said mobile station is received using a Doppler direction finder comprising:
at least one antenna spaced from a rotation point, said at least one antenna arranged in use, to be rotated physically or electronically about said rotation point, said at least one antenna being arranged to provide a first output signal comprising a signal received by said at least one antenna combined with a Doppler shift component;
circuitry for providing a second output signal comprising said received signal without said Doppler shift component;
circuitry for processing said first and said second signals to obtain said Doppler shift component; and
circuitry for determining from said Doppler shift component the direction from which said received signal is received;
said method further comprising the steps of:
determining the distance between the mobile station and a base station using timing advance information; and
determining the location of the mobile station using said determined distance and determined direction.

28. A method of locating a mobile station in a cell of a time division multiple access cellular communication network comprising the steps of:
determining the direction from which a signal transmitted by said mobile station is received using a Doppler direction finder comprising:
at least one antenna spaced from a rotation point, said at least one antenna arranged in use, to be rotated physically or electronically about said rotation point, said at least one antenna being arranged to provide a first output signal comprising a signal received by said at least one antenna combined with a Doppler shift component;
a further antenna for providing a second output signal comprising said received signal without said Doppler shift component;
circuitry for processing said first and said second signals to obtain said Doppler shift component; and
circuitry for determining from said Doppler shift component the direction from which said received signal is received;
said method further comprising the steps of:
determining the distance between the mobile station and a base station using timing advance information; and
determining the location of the mobile station using said determined distance and determined direction.

29. A Doppler direction finder comprising:
at least one antenna spaced from a rotation point, said at least one antenna arranged in use, to be rotated physically or electronically about said rotation point, said at least one antenna being arranged to provide a first output signal comprising a signal received by said at least one antenna combined with a Doppler shift component, said at least one antenna being provided on a circuit board arranged in the form of a cylinder;
circuitry for providing a second output signal comprising said received signal without said Doppler shift component;
circuitry for processing said first and said second signals to obtain said Doppler shift component; and
circuitry for determining from said Doppler shift component the direction from which said received signal is received, wherein a further circuit board is provided inside said cylinder to support at least part of the Doppler direction finder.

30. A Doppler direction finder comprising:
at least one antenna spaced from a rotation point, said at least one antenna arranged in use, to be rotated physically or electronically about said rotation point, said at least one antenna being arranged to provide a first output signal comprising a signal received by said at least one antenna combined with a Doppler shift component, said at least one antenna being provided on a circuit board arranged in the form of a cylinder;
a further antenna for providing a second output signal comprising said received signal without said Doppler shift component;
circuitry for processing said first and said second signals to obtain said Doppler shift component; and
circuitry for determining from said Doppler shift component the direction from which said received signal is received, wherein a further circuit board is provided inside said cylinder to support at least part of the Doppler direction finder.

31. A Doppler direction finder for use in a network which uses time slots comprising:
at least one antenna spaced from a rotation point, said at least one antenna arranged in use, to be rotated physically or electronically about said rotation point at least twice in one time slot, said at least one antenna being arranged to provide a first output signal comprising a signal received by said at least one antenna combined with a Doppler shift component;

circuitry for providing a second output signal comprising said received signal without said Doppler shift component;

circuitry for processing said first and said second signals to obtain said Doppler shift component; and circuitry for determining from said Doppler shift component the direction from which said received signal is received.

32. A Doppler direction finder as claimed in claim 31 wherein said direction is determined from the part of the first signal received in a middle region of the time slot.

33. A Doppler direction finder for use in a network which uses time slots comprising:

at least one antenna spaced from a rotation point, said at least one antenna arranged in use, to be rotated physically or electronically about said rotation point at least twice in one time slot, said at least one antenna being arranged to provide a first output signal comprising a signal received by said at least one antenna combined with a Doppler shift component;

a further antenna for providing a second output signal comprising said received signal without said Doppler shift component;

circuitry for processing said first and said second signals to obtain said Doppler shift component; and circuitry for determining from said Doppler shift component the direction from which said received signal is received.

34. A Doppler direction finder for use in a time division multiple access cellular communications network comprising:

at least one antenna spaced from a rotation point, said at least one antenna arranged in use, to be rotated physically or electronically about said rotation point, said at least one antenna being arranged to provide a first output signal comprising a signal received by said at least one antenna combined with a Doppler shift component;

circuitry for providing a second output signal comprising said received signal without said Doppler shift component;

circuitry for processing said first and said second signals to obtain said Doppler shift component;

circuitry for determining from said Doppler shift component the direction from which said received signal is received;

circuitry for determining the distance between a transmitter of the received signal and said Doppler direction finder using timing advance information; and determining the location of the Doppler direction finder using said determined direction and said determined distance.

35. A base station comprising a Doppler direction finder for use in a time division multiple access cellular communications network comprising:

at least one antenna spaced from a rotation point, said at least one antenna arranged in use, to be rotated physically or electronically about said rotation point, said at least one antenna being arranged to provide a first output signal comprising a signal received by said at least one antenna combined with a Doppler shift component;

circuitry for providing a second output signal comprising said received signal without said Doppler shift component;

circuitry for processing said first and said second signals to obtain said Doppler shift component;

circuitry for determining from said Doppler shift component the direction from which said received signal is received;

circuitry for determining the distance between a transmitter of the received signal and said Doppler direction finder using timing advance information; and determining the location of the Doppler direction finder using said determined direction and said determined distance.

36. A mobile station incorporating a Doppler direction finder for use in a time division multiple access cellular communications network comprising:

at least one antenna spaced from a rotation point, said at least one antenna arranged in use, to be rotated physically or electronically about said rotation point, said at least one antenna being arranged to provide a first output signal comprising a signal received by said at least one antenna combined with a Doppler shift component;

circuitry for providing a second output signal comprising said received signal without said Doppler shift component;

circuitry for processing said first and said second signals to obtain said Doppler shift component;

circuitry for determining from said Doppler shift component the direction from which said received signal is received;

circuitry for determining the distance between a transmitter of the received signal and said Doppler direction finder using timing advance information; and determining the location of the Doppler direction finder using said determined direction and said determined distance.

37. A Doppler direction finder for use in a time division multiple access cellular communications network comprising:

at least one antenna spaced from a rotation point, said at least one antenna arranged in use, to be rotated physically or electronically about said rotation point, said at least one antenna being arranged to provide a first output signal comprising a signal received by said at least one antenna combined with a Doppler shift component;

a further antenna for providing a second output signal comprising said received signal without said Doppler shift component;

circuitry for processing said first and said second signals to obtain said Doppler shift component;

circuitry for determining from said Doppler shift component the direction from which said received signal is received;

circuitry for determining the distance between a transmitter of the received signal and said Doppler direction finder using timing advance information; and determining the location of the Doppler direction finder using said determined direction and said determined distance.

* * * * *